United States Patent [19]

Kronogard

[11] 4,121,418
[45] Oct. 24, 1978

[54] COMPACT VEHICULAR GAS TURBINE POWER PLANT

[75] Inventor: Sven-Olof Kronogård, Lomma, Sweden

[73] Assignee: United Turbine AB & Co. Kommanditbolag, Malmö, Sweden

[21] Appl. No.: 727,940

[22] Filed: Sep. 29, 1976

Related U.S. Application Data

[62] Division of Ser. No. 510,769, Sep. 30, 1974, Pat. No. 3,997,283.

[51] Int. Cl.² .................. F02C 7/00; F16H 37/12
[52] U.S. Cl. .................. 60/39.75; 74/665 G; 74/665 H; 417/405; 180/70 R
[58] Field of Search .......... 60/39.16 SI, 39.75; 74/665 F, 665 G, 665 H, 665 S, 665 T, 665 P, 665 R, 416, 417, 424; 417/405; 415/122 R; 180/70 R, 70 P, 70 MS

[56] References Cited

U.S. PATENT DOCUMENTS

| 2,203,292 | 6/1940 | Best | 74/424 |
|---|---|---|---|
| 3,488,947 | 10/1970 | Miller et al. | 74/687 |
| 3,498,057 | 3/1970 | Kronogard et al. | 60/39.16 S |
| 3,546,879 | 12/1970 | Hass | 60/39.16 S |
| 3,635,019 | 1/1972 | Kronogard et al. | 60/39.16 SI |
| 3,853,432 | 12/1974 | Cronstedt | 415/122 |

FOREIGN PATENT DOCUMENTS 964,566  7/1964  United Kingdom ............... 415/122 R Primary Examiner—Robert E. Garrett
Attorney, Agent, or Firm—Holman & Stern

[57] ABSTRACT

A low-cost, light-weight automotive power plant includes a turbine operating on a first shaft and a compressor operating on a second shaft, formed as an element separate from the first shaft. These shafts are arranged at an angle to the horizontal power transfer shaft operably connected to the wheels of the vehicle. An infinitely variable transmission transfers power from the turbine to the compressor, and an angular drive transfers power from the turbine to the power transfer shaft.

3 Claims, 3 Drawing Figures

COMPACT VEHICULAR GAS TURBINE POWER PLANT

This is a divisional of application Ser. No. 510,769, filed Sept. 30, 1974, now U.S. Pat. No. 3,997,283.

BACKGROUND OF THE INVENTION

It has hitherto not been possible to produce at low cost, a gas turbine having the properties suitable for operating light vehicles, such as small cars and trucks, light water craft or for simple industrial purposes, viz. a compact design for fitting into a restricted space, and having as satisfactory economy and driving prestanda.

One reason may be that the necessary driving of the compressor has been obtained by making the shaft of the compressor integral with, or connected to the shaft of the single turbine rotor in an inefficient manner. In order to attain a desirable simplicity of design and a reduced cost, it has usually been considered necessary to use a single turbine rotor only.

The acceleration properties of a compressor and turbine, and thus of the car in which the plant is mounted, is not at all acceptable if the speed of the compressor is directly related to the speed of the turbine. Alternatively, a complicated transmission and control device would be required, which is undesirable because it complicates the operation, reduces the efficiency and increases the costs.

The space available within the engine compartment furthermore imposes certain limitations upon the engine structure.

SUMMARY OF THE INVENTION

According to the present invention, it is now proposed that the shaft of the compressor rotor and the shaft of the turbine rotor be formed as machine elements separate from each other, and be interconnected by an infinitely variable transmission system for transferring the power required for any operational condition from the turbine rotor to the compressor rotor.

A power transfer shaft, operably connected to the wheels of a vehicle is conventionally horizontally located, and in order to make use of the space available in the engine compartment, means are provided to mount the turbine and the compressor shafts at an angle to the power transfer shaft, angular drive means being provided to transfer power from the turbine shaft to the power transferring shaft.

DESCRIPTION OF SOME PREFERRED EMBODIMENTS

Figure 1:
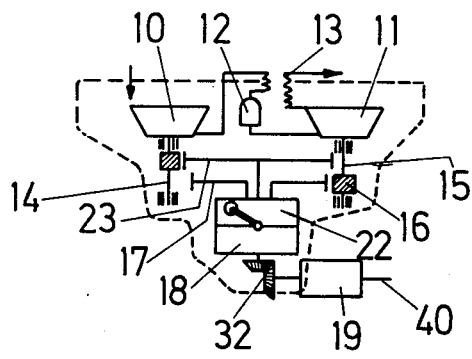
FIG. 1 shows a basic arrangement according to the invention.

A plant according to FIG. 1 includes a compressor 10, a turbine 11, a combustion chamber 12 and a heat exchanger 13. A shaft 14 of the compressor is an element separate from the shaft 15 of the turbine, but shafts 14 and 15 are interconnected in such a manner that the required power for any condition of load can be transferred from the turbine to the compressor and to the output shaft, respectively.

The turbine shaft 15 is, by way of two meshing gear wheels 16 and 17, connected to an infinitely variable transmission 22 which by way of a gear wheel 23 is connected to the compressor shaft 14. In this manner the necessary power for driving the compressor in response to the occasional load upon the plant is obtained. A free-wheel (not shown) ensures that the compressor is maintained in operating condition also when the vehicle is at standstill, and it is easy to accelerate the compressor when starting the vehicle.

A reduction gear 18 is operably connected to the turbine shaft, and its output is, by way of an angular drive 32, connected to a further gear box 19 including a reversing step. The output shaft 40 from gear box 19 is operably connected to a pair of wheels (not shown) at the vehicle and transfers in a conventional manner the power for driving said wheels.

In order to make the best possible use of the available space within the engine compartment, the turbine and the compressor shafts are according to FIG. 1 mounted vertically, the rotors being arranged in substantially the same horizontal plane, and with the axes of the variable transmission 22 and the first reduction gear 18, arranged vertically and below the rotors. This arrangement provides a high degree of accessibility to the main components of the power plant and a simple manner of mounting.

Figure 2:
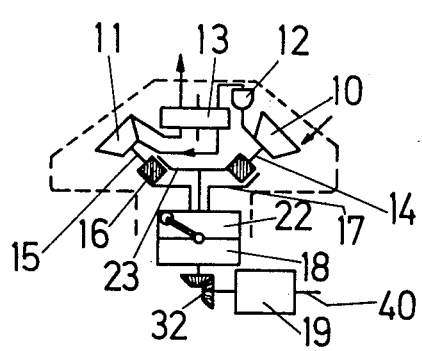
FIG. 2 shows a modified arrangement where the turbine and the compressor shafts are arranged at an angle to each other.

A modification of this arrangement is shown in FIG. 2, in which the shafts of the compressor and the turbine are arranged at an angle to each other to form a V, but in which the various components are mounted in basically the same manner as in FIG. 1. This will provide a still more compact arrangement.

Figure 3:
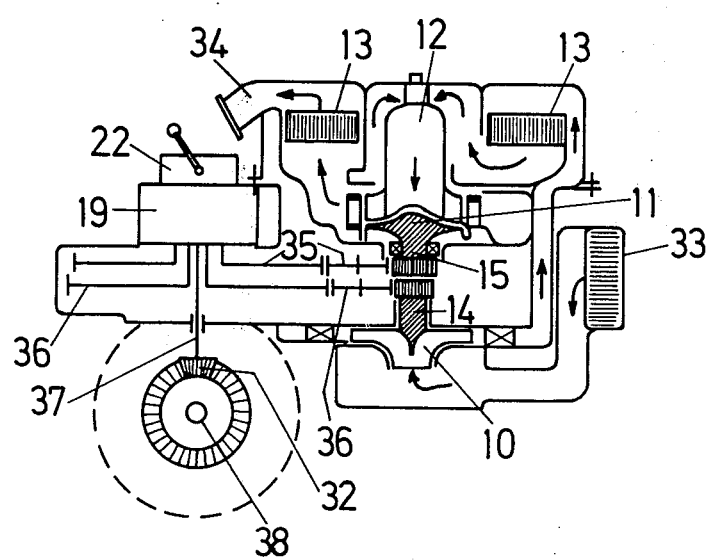
FIG. 3 shows in more detail a mounting arrangement according to the invention.

FIG. 3 shows a further manner of installing the plant. The compressor 10 and the turbine 11 are mounted with their shafts 14 and 15, respectively, vertically aligned. The combustion chamber 12 is provided directly above these rotors and the heat exchanger 13 is annular and encloses the combustion chamber. Air is drawn in by way of a combined filter and intake silencer 33 and is led down below the machinery. From the compressor, the air is conveyed by passages (not shown) to the air preheater, and then further onto the combustion chamber, from which the gases pass onto the turbine rotor and then through the preheater to an outlet 34. The air preheater will serve as an exhaust silencer. The turbine shaft 15 is, by way of a simple gearing 35, connected to the infinitely variable transmission 22, which on the one hand drives the compressor shaft by way of a single gearing 36, and on the other hand by way of an output shaft 37 in conventional manner works upon the bevel gear differential 32 at one of the shafts 38 mounting a pair of wheels at the vehicle. The axes of all transmission members, thus, are vertical. The transmission members are located beside the turbine and compressor rotors. Also, in this arrangement all main and auxiliary components are easily dismounted and accessible from above. The plant is suited for mounting in the rear of the vehicle as well as in front thereof, for driving the front wheels or the rear wheels. Due to its reduced height, the plant is also suited for mounting centrally in a vehicle for driving two or four wheels, shaft 38 then being a conventional power transfer shaft.

The heat exchanger can be of the stationary, recuperative type, or a rotating unit, and may be arranged for axial or for radial flow of the fluids. In the last mentioned case, the passages may be strictly radial, or arcuate whereby the direction of flow remains constant and/or the desired area is obtained and further a desired rotation of the air flowing into the combustion chamber is obtained.

What I claim is:

1. A gas turbine power plant in combination with a vehicle having ground engaging wheels, said power plant operably connected to at least one pair of said wheels by a horizontal drive shaft, said power plant further including:
   a turbine having a single rotor mounted upon a first shaft and a compressor having a rotor mounted upon a second shaft, said second shaft separate from said first shaft;
   means for mounting said first and second rotors at substantially the same level, with their shafts substantially perpendicular to the horizontal drive shaft, said first and second shafts arranged at an angle to each other, forming a V;
   an infinitely variable transmission member for transferring power from said first shaft to said second shaft in response to an occasional load upon the compressor;
   means for mounting said variable transmission member and said first reduction gearing below said rotors with their associated shafts parallel to said first and said second rotor shafts; and
   angular drive means for transferring power from the shaft of said first reduction gearing to said horizontal drive shaft.

2. A gas turbine power plant in combination with a vehicle having ground engaging wheels, said power plant operably connected to at least one pair of said wheels by a horizontal drive shaft, said power plant including:
   a turbine having a single rotor mounted upon a first shaft and a compressor having a rotor mounted upon a second shaft, said second shaft separate from said first shaft;
   means for mounting said first and said second rotors, with their shafts aligned and substantially perpendicular to the horizontal drive shaft wherein said turbine is located on top of the compressor, and a combustor is located on top of the turbine, axially aligned with the same and having its output directed towards said turbine;
   an infinitely variable transmission member for transferring power from said first shaft to said second shaft in response to an occasional load upon the compressor;
   a first reduction gearing having an output shaft;
   means for mounting said variable transmission member and said first reduction gearing below said rotors with their associated shafts parallel to said first and said second rotor shafts; and
   a bevel gear differential for directly connecting said output shaft and said horizontal drive shaft.

3. A gas turbine power plant in combination with a vehicle having ground engaging wheels, said power plant operably connected to at least one pair of said wheels by a horizontal drive shaft, said power plant further including:
   a turbine having a single rotor mounted upon a first shaft and a compressor having a rotor mounted upon a second shaft, said second shaft separate from said first shaft;
   means for mounting said first and second shafts in parallel and substantially perpendicular to said horizontal drive shaft;
   means for mounting said turbine rotor and said compressor rotor in a spaced relationship for rotation in substantially the same horizontal plane;
   conduit means connecting said compressor to said turbine and including a combustor therein;
   an infinitely variable transmission member for transferring power from said first shaft to said second shaft in response to an occasional load upon said compressor;
   a first reduction gearing;
   means for mounting said variable transmission member and said first reduction gearing below said rotors with their associated shafts parallel to said first and said second rotor shafts; and
   angular drive means for transferring power from the shaft of said first reduction gearing to said horizontal drive shaft.

* * * * *